June 27, 1961   J. E. BROCK   2,989,888
SEGMENTED LOCK MEANS FOR BEARING
Filed May 15, 1957

INVENTOR.
James E. Brock
BY
Thomas W. Secrest
ATTORNEY

United States Patent Office 2,989,888
Patented June 27, 1961

2,989,888
SEGMENTED LOCK MEANS FOR BEARING
James E. Brock, 5011 42nd SW., Seattle, Wash.
Filed May 15, 1957, Ser. No. 659,324
1 Claim. (Cl. 85—8.6)

My invention relates to a locking means for a bearing and, more particularly, to such a locking means which is readily installed, positive in its locking or retaining action in maintaining the bearing in position, adjustable with respect to positioning the bearing to allow relatively loose manufacturing tolerances and easy to remove so as to replace the bearing.

An object of my invention is the provision of a locking means for maintaining a bearing in position.

A further object is to provide a locking means which is capable of sufficient range of adjustment to compensate for manufacturing tolerances of all parts of an assembly in which it may be used.

An additional object is to provide a locking means which is both easy to install and to remove for replacement of the bearing without special tools.

A still further object is the provision of a locking means which is compact and lightweight.

With the above and other objects in view which will more readily appear as the nature of the invention is better understood, the same consists in the novel construction, combination and arrangement of parts hereinafter more fully described, illustrated and claimed.

Referring to the drawing.

Figure 1:
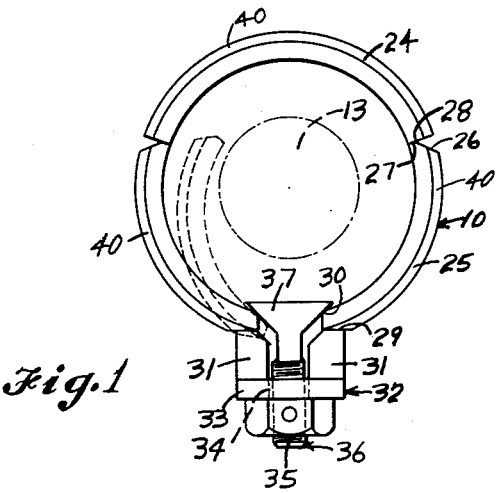
FIG. 1 is a front elevational view of a specific embodiment of the invention constructed in accordance with the preferred teachings thereof, and illustrates by phantom an inward swinging of one of the curved sections.
Figure 2:
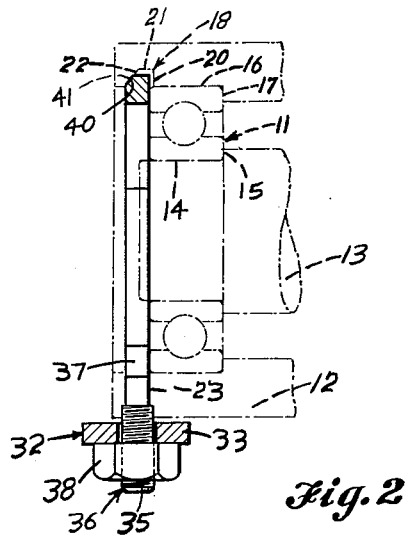
FIG. 2 is a longitudinal vertical cross-sectional view of the locking means maintaining a bearing, in phantom, in position in a housing; and, FIG. 3, a front exploded elevational view of the components of the locking means as illustrated in FIGURE 1 so as to more descriptively depict them.
Figure 3:
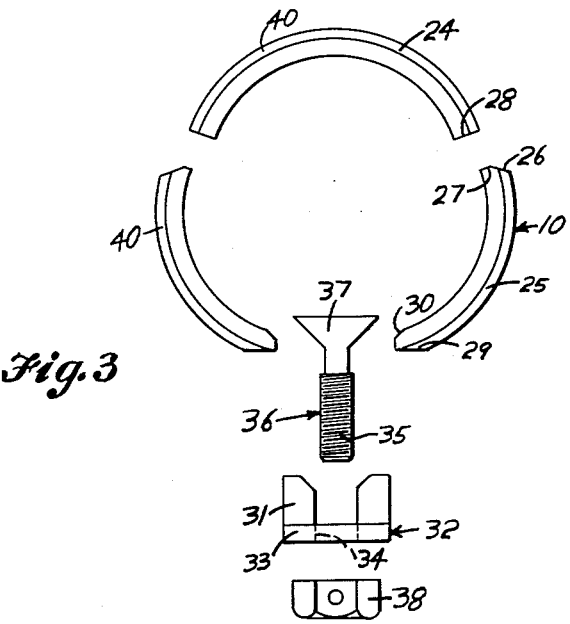

Prior to specifically discussing my invention a brief word will be mentioned in regard to some of the other means for bearing retention. Some of these are by staking, snap rings, nuts, ring swaging and bonding. Broadly speaking, in staking the metal housing the bearing is caused to flow over the chamfered edge of the outer race of the bearing. Staking may comprise roller, ball or point staking. In roller staking a beaded roller is pressed into the surface of the bearing housing adjacent to the bore and upon rotation the roller forms a circular groove. Roller staking may be used for wrought or cast aluminum alloys, magnesium alloys and steel alloys that are not heat treated over 145,000 pounds per square inch. Bearings retained in this manner can be replaced twice. In ball staking hard steel balls are impressed around the surface of the bore so that the metal flows around the bearing race. This method of staking is normally limited to wrought aluminum alloys and steel alloys that are not heat treated over 145,000 pounds per square inch. Ball staked bearings can be replaced in the same housing if unstaked metal is available for new impressions. In point staking the tool is similar to the one used for ball staking in that the steel balls are replaced by a hard projection such as spherically tipped carbide projections. The metal is forced to flow over the edge of the bearing race. Point staking is used in steel that has been heat treated in the 145,000–200,000 pounds per square inch, but it is not used in aluminum and magnesium alloys. Point staked bearings can be replaced in the same housing if unstaked metal is available for new impressions.

Turning now to snap rings these are used for retaining bearings that are subjected to secondary thrust loads and yet require frequent replacement. To insure dependable bearing retention the dimensions of the snap ring grooves must be rigidly inspected and the rings installed carefully. However, the rings are easily installed and removed, but may be damaged during the process. Therefore, their re-use is prohibited.

In regard to ring swaging a bearing can be retained by pressing a soft aluminum alloy ring into a groove machined in a housing bore or a shaft. The soft ring flows over and around a chamfered edge of the bearing race so as to position the same. When mechanical retention is impractical ring swaging is used for a bearing subjected to thrust loads. However, this method suffers the drawbacks in that removal of the bearing is difficult, the swaged ring cannot be reused and that the swaging operation may crack the bearing housing.

Bearings may be adhesively bonded where space limitations, material restrictions or bearing designs will not allow the use of staking. This method of retention is suitable for wrought or cast alloys of aluminum, steel or magnesium, but is not permitted if direct thrust loads are imposed on the bonded point. However, the cementing of bearings has a number of disadvantages as bearing removal is extremely difficult, strict quality control must be exercised during the bonding operation and the bonded joint cannot be easily inspected.

A bearing retaining nut can carry a heavy thrust load but it is cumbersome to lock in place and requires a special wrench. It also wastes space and imposes a weight penalty.

Referring to the drawing it is seen that the invention comprises a locking means 10 for a bearing. This means locks a bearing 11 in position in a housing 12 over an arbor or shaft 13. The end of the shaft is of a reduced diameter 14 with a shoulder 15 against which abuts the bearing 11. At approximately a corresponding position in the interior wall of the housing the housing is recessed into a larger diameter 16. At junction of the recess 16 and the main part of the housing is a shoulder 17. The outer race of the bearing 11 also abuts against the shoulder 17. Near the free end of the housing 12 is an interior circumferential groove 18. In the vertical lateral cross-sectional view the groove is of trapezoidal configuration having a wall 20 normal to the wall of the recess 16, a radial wall 21 and an outwardly sloping wall 22 which runs into the outer edge of the recess 16. Also, in the housing 12 is a diametrical opening 23 and in which there is received a part of the locking means 10, namely, a keying pin.

The locking means comprises a major part of a ring covering approximately an arc of 345–350°. This part of the ring is composed of three sections, a section 24 and two sections 25. The sections 25 being substantially mirror images. The section 24 extends through an arc of about 120°. As the two sections 25 are mirror images only one will be described. The end of the section near 24 is cut away on its outer circumferential portion to form a sloping shoulder 26. Approximately the outer half of the wall of the section 25 abutting the section is cut back so that only about half of the wall thickness at edge 27 abuts edge 28 of section 24. It is readily appreciated that the sloping edge 26 makes it possible to swing the section 25 inwardly upon disassembling with less slack required than otherwise would be the case. The same would be true when swinging 25 into place upon assembling.

Turning now to the other end of the section 25, i.e., that end opposed to end 27, this end comprises sloping edges 29 and 30. The edge 29 is on the outer surface of section 25 and slopes outwardly from the end, and the edge 30 is on the inner surface of the section and slopes inwardly. In effect, the two edges 29 and 30 in approaching the end converge toward each other. The edge 29 provides a bearing surface for the end of leg 31 on yoke 32, and the edge 30 provides a bearing surface for a head 37 on a bolt 36.

The yoke 32 comprises a base 33 and the two depending legs 31. In the central part of the base is a passageway 34 for receiving a threaded shank 35 of the bolt 36. This bolt has a flat head 37 on one end, in an end elevation view is of the configuration similar to that of a triangle or a trapezoid, and is of a thickness somewhat less than the thickness of the threaded shank.

In operative relationship for retaining a bearing in position the sections 24 and 25 are in the groove 18. The head 37 of the bolt is bearing against the diagonal edge 30 of each section 25 and the shank 35 of the bolt is projecting through the diametrical opening 23 in the housing 12 and the passageway 34 in the yoke. And the legs 31 of the yoke project inwardly through the opening 23 with their inner ends bearing against the diagonal edges 29. A nut 38 screws onto that portion of the bolt projecting through the yoke and can be tightened so as to force the sections 24 and 25 into the groove 18 by expanding these sections to fill the groove.

As is seen from the drawings the inner surfaces of the sections 24 and 25 define a smaller enclosure than the bearing 11 and thereby tend to keep the same positioned in the housing 12. Also, the sections 24 and 25 define a larger perimeter than the housing 12 and can be expanded or forced into the guide groove 18. In this forcing step or expansion of the ring bevelled edge 40 co-functions with tapered side 41 of the groove 18 to guide the sections 24 and 25 into position. This guiding movement directs the sections 24 and 25 axially inward to bear against the bearing.

Referring to FIGURE 1 it can be visualized that upon the loosening of the nut the bolt is free to move toward the center of the locking means. With the bolt so moving the sections 25 are easily able to swing inwardly. This is possible because of the edge 26 which tapers away from the edge 27. As a result the edge 26 easily clears the inner corner of the edge 28. Conversely, the locking means is easily assembled as the section 25 can be swung into position because the tapered edge 26 again clears the inner corner of the edge 28. With the locking means assembled the nut 38 can be tightened as previously explained so as to lock the same firmly in position.

It is to be realized that the legs 31 of the yoke 32 and the head 37 of the bolt 36 coact to both circumferentially expand the sections 24 and 25 and to prevent the ends of the sections from digging into the groove 18. More particularly, as the nut 38 is tightened the head 37 is forced against the diagonal edges 30. This results in a circumferential expansion of the sections 24 and 25. Also, as the nut 38 is tightened the ends of the legs 31 bear against the edges 29. This prevents the edges 29 from digging into the groove 18. In effect, the inward thrust of the legs 31 balances the outward thrust of the head 37.

I wish it to be understood that I do not desire to be limited to the exact details of construction shown and described for obvious modifications will occur to a person skilled in the art. For example, this invention may be employed to retain mechanical members other than bearings in position such as retaining the end members of a hydraulic actuating cylinder in position.

In the claim affixed to this specification no selection of any particular modification of the invention is intended to the exclusion of other modifications thereof and the right to subsequently make claim to any modification not covered by this claim is expressly reserved.

I claim:

A locking means for maintaining a bearing in position, said locking means comprising a multiplicity of curved sections of a ring, all of said sections taken together defining less than a complete ring so as to leave an opening between adjacent but non-contiguous ends of two of the sections, each of said sections adjacent the opening having an inner bearing surface on the inner surface of the section, each of said sections adjacent the opening having an exterior bearing surface on the exterior surface of the section, a yoke bridging said opening and contacting the exterior surface on each of the two sections adjacent the opening, said yoke comprising a base and two spaced apart depending legs, said base having a passageway, an expander bearing against said inner bearing surface on each of the two sections adjacent the opening, said expander having a shank projecting through the opening and the passageway in the base, means to draw said shank through the yoke so as to have the expander bear against the sections to expand the same and the legs of the yoke bearing against said exterior surface on each of the two sections adjacent the opening, and one of the sections contiguous to another section in operative relation having a radial bearing surface on the section for bearing against a contiguous radial bearing surface on one of the other sections, and the outer part of one of the radial bearing surfaces being removed to define a surface sloping outwardly and away from the contiguous radial bearing surface so that there is freedom of movement upon swinging inwardly the section.

References Cited in the file of this patent

UNITED STATES PATENTS

| | | |
|---|---|---|
| 1,217,804 | Metzger | Feb. 27, 1917 |
| 1,965,729 | Tessky | July 10, 1924 |
| 1,703,018 | Stiennon | Feb. 19, 1929 |
| 1,821,976 | Holland | Sept. 8, 1931 |
| 1,888,260 | Clark | Nov. 22, 1932 |
| 2,476,586 | Darash | July 19, 1949 |
| 2,491,128 | Nelson | Dec. 13, 1949 |
| 2,880,017 | Anderson | Mar. 31, 1959 |